US010705671B2

(12) United States Patent
Wang

(10) Patent No.: US 10,705,671 B2
(45) Date of Patent: Jul. 7, 2020

(54) INFORMATION SHARING METHOD, TERMINAL, AND STORAGE MEDIUM

(71) Applicant: Tencent Technology (Shenzhen) Company Limited, Shenzhen (CN)

(72) Inventor: Fa Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/699,724

(22) Filed: Sep. 8, 2017

(65) Prior Publication Data

US 2017/0371501 A1 Dec. 28, 2017

Related U.S. Application Data

(63) Continuation-in-part of application No. PCT/CN2016/085733, filed on Jun. 14, 2016.

(30) Foreign Application Priority Data

Nov. 17, 2015 (CN) .......................... 2015 1 0788105

(51) Int. Cl.
*G06F 3/0488* (2013.01)
*H04L 5/04* (2006.01)
(Continued)

(52) U.S. Cl.
CPC .............. *G06F 3/0481* (2013.01); *G06F 3/14* (2013.01); *G06F 3/1454* (2013.01); *H04N 7/147* (2013.01);
(Continued)

(58) Field of Classification Search
None
See application file for complete search history.

(56) References Cited

U.S. PATENT DOCUMENTS 5,469,541 A * 11/1995 Kingman ................. G09G 5/14 345/545
2002/0126396 A1* 9/2002 Dolgoff ............. G02B 27/2278 359/743

(Continued)

FOREIGN PATENT DOCUMENTS

CN 102447715 A 5/2012
CN 103942040 A 7/2014

(Continued)

OTHER PUBLICATIONS

Merriam Webster: https://www.merriam-webster.com/dictionary/mirror%20image Archived at: https://web.archive.org/web/20120504221723/https://www.merriam-webster.com/dictionary/mirror%20image May 4, 2012 (Year: 2012).*

(Continued)

*Primary Examiner* — Nasser M Goodarzi
*Assistant Examiner* — Terrika Peterson
(74) *Attorney, Agent, or Firm* — Morgan, Lewis & Bockius LLP

(57) ABSTRACT

This application discloses an information sharing method performed at a first terminal communicatively coupled to a second terminal, the method comprising: launching a live video chat window including a first display region and a second display region; receiving a user request for information sharing between the first terminal and the second terminal; in response, launching an information sharing window within a predefined region that at least partially covers at least a portion of one of the first display region and the second display region; receiving a user instruction for rendering one or more objects in the information sharing window; and in response, rendering the one or more objects in the information sharing window in a manner such that the live video stream in the covered portion of the one of the first (Continued)

Information sharing window A2 display region and the second display region is visible to the user through the information sharing window.

16 Claims, 10 Drawing Sheets

(51) Int. Cl.

| | |
|---|---|
| ***G06F 3/0481*** | (2013.01) |
| ***G06F 3/14*** | (2006.01) |
| ***H04N 7/14*** | (2006.01) |
| ***H04N 7/15*** | (2006.01) |
| ***H04N 21/2187*** | (2011.01) |
| *H04N 5/44* | (2011.01) |

(52) U.S. Cl.
CPC .......... *H04N 7/15* (2013.01); *H04N 21/2187* (2013.01); *G09G 2370/022* (2013.01)

(56) References Cited

U.S. PATENT DOCUMENTS

| | | | | |
|---|---|---|---|---|
| 2006/0236247 | A1 | 10/2006 | Morita et al. | |
| 2010/0115559 | A1* | 5/2010 | Ellis | H04N 5/44543 725/53 |
| 2012/0182384 | A1* | 7/2012 | Anderson | H04L 12/1827 348/14.09 |
| 2012/0221960 | A1* | 8/2012 | Robinson | G06F 3/0488 715/751 |
| 2014/0118477 | A1* | 5/2014 | Dodd | H04N 7/15 348/14.13 |
| 2014/0282086 | A1* | 9/2014 | Shi | H04L 51/046 715/752 |
| 2015/0046834 | A1* | 2/2015 | Wu | H04L 51/04 715/748 |
| 2015/0189032 | A1* | 7/2015 | Duquene | H04L 51/046 709/204 |
| 2015/0222699 | A1* | 8/2015 | Quinn | H04L 67/1091 709/203 |
| 2016/0099984 | A1* | 4/2016 | Karagiannis | H04L 51/046 709/206 |

FOREIGN PATENT DOCUMENTS

| | | | |
|---|---|---|---|
| CN | 104349109 | A | 2/2015 |
| CN | 104461220 | A | 3/2015 |
| CN | 104573090 | B | 3/2017 |

OTHER PUBLICATIONS

Tencent Technology, ISRWO, PCT/2016/085733, Sep. 19, 2016, 8 pgs.

Tencent Technology, IPRP, PCT/2016/085733, May 22, 2018, 7 pgs.

* cited by examiner

INFORMATION SHARING METHOD, TERMINAL, AND STORAGE MEDIUM

RELATIONS APPLICATIONS

This application is a continuation-in-part application of PCT/CN2016/085733, entitled "INFORMATION SHARING METHOD, TERMINAL, AND STORAGE MEDIUM" filed on Jun. 14, 2016, which claims priority to Chinese Patent Application No. 201510788105.2, filed with the State Intellectual Property Office of the People's Republic of China on Nov. 17, 2015, and entitled "INFORMATION SHARING METHOD, TERMINAL, AND STORAGE MEDIUM", both of which are incorporated herein by reference in their entirety.

FIELD OF THE TECHNOLOGY

This application relates to information processing technologies, and in particular, to an information sharing method, a terminal, and a storage medium.

BACKGROUND OF THE DISCLOSURE

Currently, for a social application tool such as WeChat or QQ on a terminal device such as a smart phone or a tablet computer widely used, when a video call function mode is enabled for the social application, if structured multimedia information such as a photograph, news, or a micro blog needs to be shared, the video call function mode needs to be exited, and the multimedia information is shared by sending the multimedia information to the other party by using an opened all-in-one window, and two parties of a video call cannot perform interactive control operations on the multimedia information that has been shared.

SUMMARY

In view of this, embodiments of this application provide an information sharing method and a terminal to resolve the problem in the existing technology.

The technical solutions in the embodiments of the this application are implemented as follows:

According to a first aspect, an embodiment of this application provides an information sharing method, including:

performing, by a first terminal and a second terminal, information processing;

composing, in a display window of the first terminal and a display window of the second terminal, an information sharing window for simultaneous display, so that the information sharing window and the live chat window of the first terminal are displayed together, and the information sharing window and the display window of the second terminal are displayed together;

presenting, in the information sharing window, an operation that is performed by the first terminal in response to a detected first information selection instruction and an operation that is performed by the second terminal in response to a detected second information selection instruction; and presenting, in the information sharing window when the presentation operation is completed, first target information corresponding to the first information selection instruction and second target information corresponding to the second information selection instruction.

According to a second aspect, an embodiment of this application further provides a first terminal, including an information processing module, a window composition module, a first display control module, and a second display control module, where the information processing module is configured to implement an information processing process between the first terminal and a second terminal;

the window composition module is configured to compose, in a display window of the first terminal and a display window of the second terminal based on a preset composition policy, an information sharing window for simultaneous display, so that the information sharing window and the live chat window of the first terminal are displayed together, and the information sharing window and the display window of the second terminal are displayed together;

the first display control module is configured to present, in the information sharing window, an operation that is performed by the first terminal in response to a detected first information selection instruction and an operation that is performed by the second terminal in response to a detected second information selection instruction; and the second display control module is configured to present, in the information sharing window when the presentation operation is completed, the first target information corresponding to the first information selection instruction and the second target information corresponding to the second information selection instruction.

In the foregoing solution, the window composition module includes an adjustment unit, where the adjustment unit is configured to: adjust the live chat window of the first terminal according to a first display parameter, adjust the information sharing window according to a second display parameter, and combine the adjusted windows, where the adjusted information sharing window and the adjusted display window of the first terminal are displayed through interposition in different transparencies.

In the foregoing solution, the window composition module includes a sending unit, where the sending unit is configured to send, to the second terminal, an adjustment instruction carrying a third display parameter and a fourth display parameter, where the third display parameter is used to cause the second terminal to adjust the display window of the second terminal, and the second terminal adjusts the information sharing window according to the fourth display parameter, and combines the adjusted windows, where the adjusted information sharing window and the adjusted display window of the second terminal are displayed through interposition in different transparencies.

In the foregoing solution, the first display control module includes a detection unit, a first display control unit, a first obtaining unit, and a second display control unit, where the detection unit is configured to detect the first information selection instruction based on the live chat window of the first terminal;

the first display control unit is configured to control to present, in the information sharing window, the operation that is performed by the first terminal in response to the first information selection instruction;

the first obtaining unit is configured to obtain the second information selection instruction that is detected by the second terminal based on the display window of the second terminal; and the second display control unit is configured to control to present, in the information sharing window, the operation that is performed by the second terminal in response to the second information selection instruction.

In the foregoing solution, the first display control unit is configured to: control to present an information obtaining interface in the information sharing window, and control to present a dynamic process in which the first information is selected in the information obtaining interface, and a dynamic process in which the first information is uploaded to the information sharing window.

In the foregoing solution, the second display control module includes a second obtaining unit and a third display control unit, where the second obtaining unit is configured to obtain operation instructions or an operation instruction for the first target information and/or the second target information, where the operation instructions or the operation instruction are/is obtained based on detecting the information sharing window presented by the first terminal, or based on detecting the information sharing window presented by the second terminal; and the third display control unit is configured to: in response to the operation instructions or the operation instruction, control to present, in the information sharing window, operations or an operation of correspondingly adjusting the first target information and/or the second target information, and present the adjusted first target information and/or the adjusted second target information after adjustment is completed.

According to a third aspect, an embodiment of this application provides a terminal, including:

a storage medium, configured to store computer executable instructions; and a processor, configured to execute the computer executable instructions stored in the storage medium, the computer executable instructions including:

performing information processing with a second terminal;

composing, in a display window of the first terminal and a display window of the second terminal, an information sharing window for simultaneous display, so that the information sharing window and the live chat window of the first terminal are displayed together, and the information sharing window and the display window of the second terminal are displayed together;

presenting, in the information sharing window, an operation that is performed by the first terminal in response to a detected first information selection instruction and an operation that is performed by the second terminal in response to a detected second information selection instruction; and presenting, in the information sharing window, first target information corresponding to the first information selection instruction and second target information corresponding to the second information selection instruction.

According to a fourth aspect, an embodiment of this application provides a storage medium, the storage medium storing executable instructions, and the executable instructions being used to execute the information sharing method provided in the embodiments of this application.

DESCRIPTION OF EMBODIMENTS

The technical solutions of this application are further explained in detail below with reference to the accompanying drawings and specific embodiments.

Embodiment 1

Figure 1A:
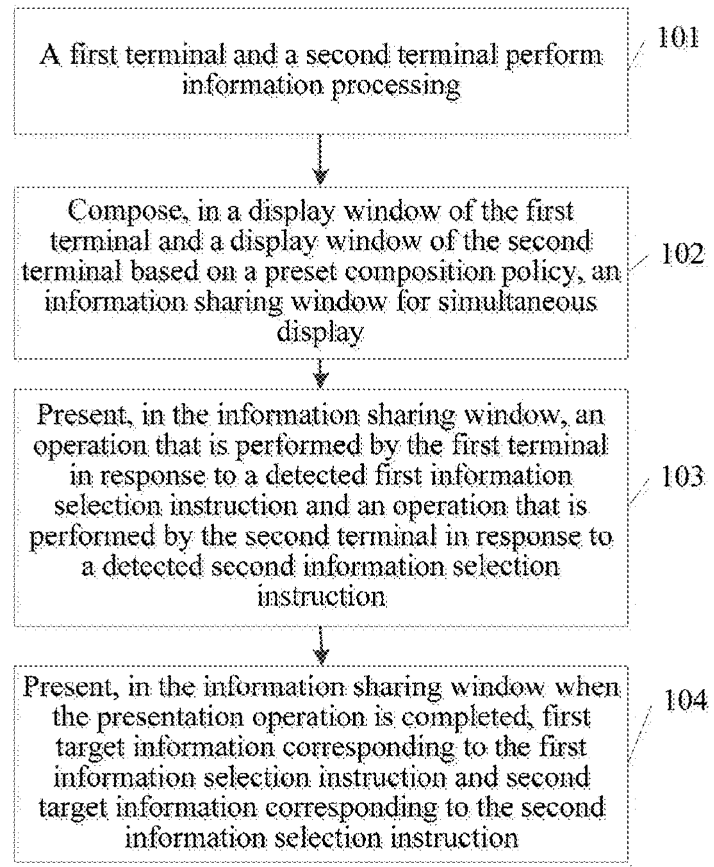
FIG. 1*a* is a schematic diagram of an implementation procedure of an information sharing method according to Embodiment 1 of this application.

FIG. 1*a* is a schematic diagram of an implementation procedure of an information sharing method according to Embodiment 1 of this application. As shown in FIG. 1*a*, the method includes:

Step 101. A first terminal and a second terminal communicatively coupled to the first terminal through a network (e.g., the Internet) perform information processing. In some embodiments, both the first terminal and the second terminal are communicatively coupled to a server that hosts a social networking application and the two terminals each have a user account of the social networking application logging into the server so that they can exchange information with each other through the server.

Herein, the first terminal performs information processing by running a first application (e.g., an instant messaging application) and by using the second terminal running the first application. The first application may be any application scenario such as a video call, a text chat, or an interactive game. Certainly, in this embodiment of this application, in a process in which the first terminal performs information processing by running the first application and by using the second terminal running the first application, related information corresponding to the first application is presented in a display window of the first terminal, and related information corresponding to the first application is presented in a display window of the second terminal.

Figure 1B:
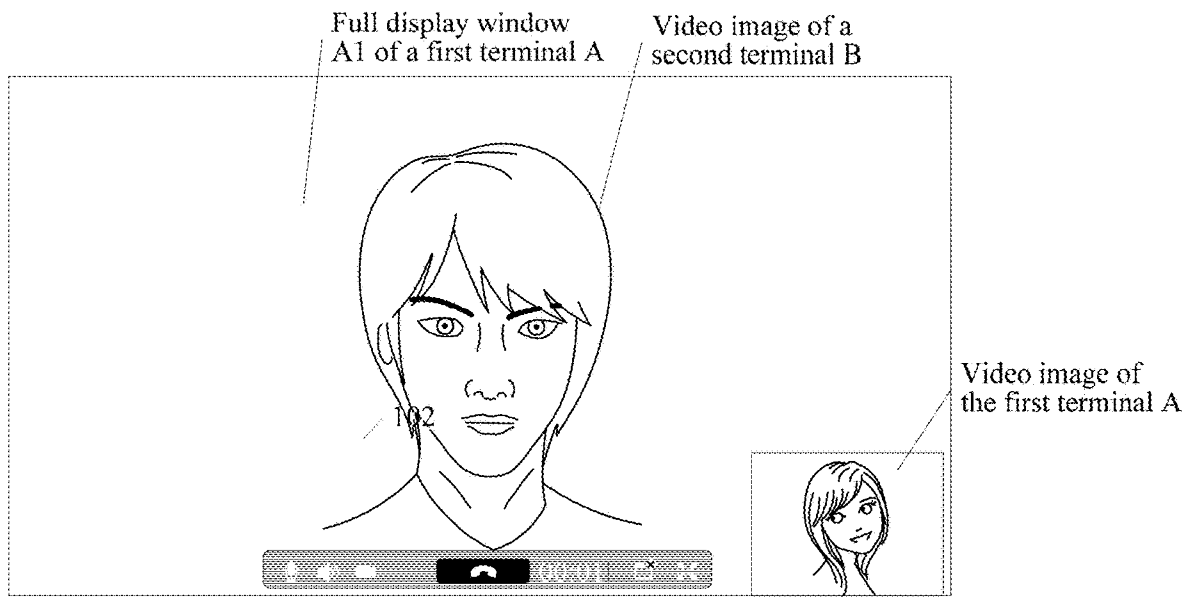
FIG. 1*b* is a schematic display diagram of displaying a window by a terminal according to Embodiment 1 of this application.

In an example, as shown in FIG. 1*b*, the first terminal launches a live video chat window on the display, the live video chat window including a first display region displaying a live video stream captured by a camera of the first terminal and a second display region displaying a live video stream captured by a camera of the second terminal. In a process in which the first terminal A and the second terminal B perform a video call, a video image of the second terminal B is presented in a full-screen display window A1 of the first terminal A, and a video image of the first terminal A is also presented in a full-screen window of the second terminal B. Certainly, the video image of the first terminal A may also be presented in a partial area of the full-screen display window A1 of the first terminal A, and the video image of the second terminal B may be presented in the full-screen display window of the second terminal B.

In some embodiments, the first terminal receives, from a user of the first terminal, a request for information sharing between the first terminal and the second terminal. Note that this information sharing is not the same as the live video streams shown in FIG. 1*b*. Rather, as shown below in connection with FIG. 2*b*, in response to the user request, the first terminal launches an information sharing window within a predefined region of the live video chat window, wherein the information sharing window at least partially covers at least a portion of one of the first display region and the second display region. In addition, the first terminal forwards the user request to the second terminal, wherein the second terminal is configured to launch an information sharing window within a predefined region of a live video chat window on a display of the second terminal.

Step 102. Compose, in a display window of the first terminal and a display window of the second terminal based on a preset composition policy, an information sharing window for simultaneous display, so that the information sharing window and the live chat window of the first terminal are displayed together, and the information sharing window and the display window of the second terminal are displayed together.

Herein, the preset composition policy may include an interposition manner of multiple windows, a display transparency, or the like. The interposition manner of multiple windows may include partial interposition or entire interposition. The display transparency may be set to any value, provided that an effect of simultaneous display of multiple windows is not affected.

Figure 1C:
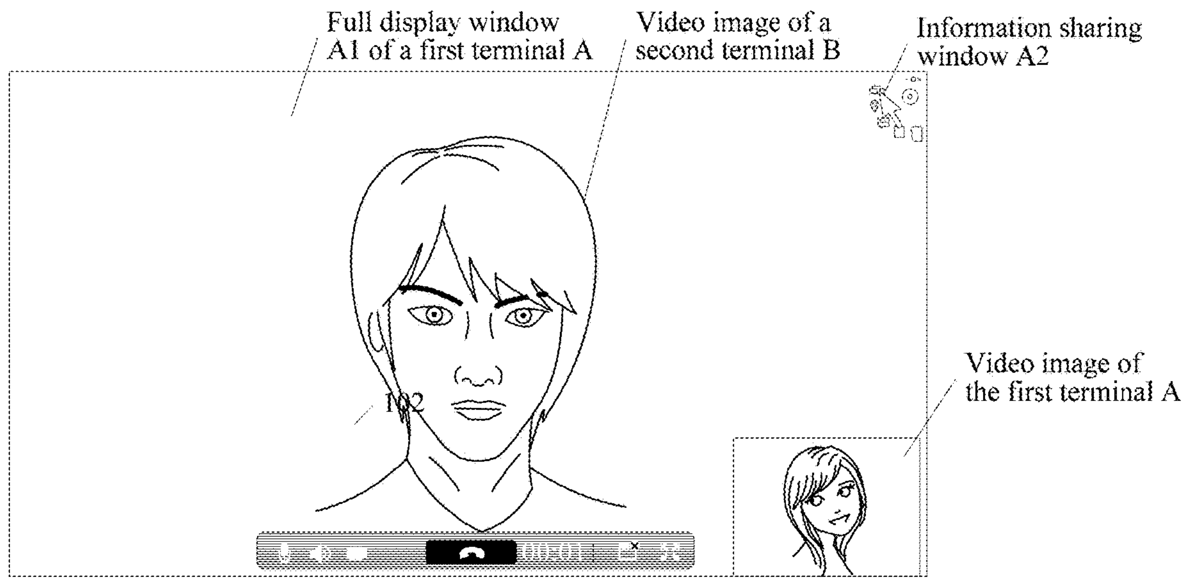
FIG. 1*c* is a schematic display diagram of displaying two windows together by the terminal according to Embodiment 1 of this application.

In an example, as shown in FIG. 1*c*, the information sharing window A2 for simultaneous display is composed in the full-screen display window A1 of the first terminal based on the preset composition policy, so that the information sharing window A2 and the full-screen display window A1 of the first terminal are displayed together, and are displayed together in a partial interposition manner.

Step 103. Present, in the information sharing window, an operation that is performed by the first terminal in response to a detected first information selection instruction and an operation that is performed by the second terminal in response to a detected second information selection instruction.

Herein, the first information selection instruction may include an instruction for selecting information such as a picture, a game, news, a micro blog, a web page, a geographical position, or a point of interest (POI) that is to be shared. Similar to the first information selection instruction, the second information selection instruction may also include an instruction for selecting information such as a picture, a game, news, a micro blog, a web page, a geographical position, or a POI that is to be shared.

In an example, in step 103, specifically, the operation that is performed by the first terminal in response to the first information selection instruction may be presented in the information sharing window based on detecting the first information selection instruction by the live chat window of the first terminal, and the operation that is performed by the second terminal in response to the second information selection instruction and that is presented in the information sharing window by the second terminal based on the second information selection instruction detected by the display window of the second terminal is obtained.

Step 104. Present, in the information sharing window when the presentation operation is completed, first target information corresponding to the first information selection instruction and second target information corresponding to the second information selection instruction.

Herein, the first target information and the second target information may include multiple types such as a picture, a game, news, a micro blog, a web page, a geographical position, or a POI that is to be shared. Certainly, types of the first target information corresponding to the first information selection instruction and the second target information corresponding to the second information selection instruction may be the same or may be different.

In this embodiment of this application, in a process in which a first terminal and a second terminal perform information processing, an information sharing window for simultaneous display is composed in a display window of the first terminal and a display window of the second terminal based on a preset composition policy, so that the information sharing window and the live chat window of the first terminal are displayed together, and the information sharing window and the display window of the second terminal are displayed together; further, an operation that is performed by the first terminal in response to a detected first information selection instruction and an operation that is performed by the second terminal in response to a detected second information selection instruction are presented in the information sharing window; and first target information corresponding to the first information selection instruction and second target information corresponding to the second information selection instruction are presented in the information sharing window when the presentation operation is completed. In this way, based on displaying the information sharing window and the live chat window of the first terminal together and the information sharing window and the display window of the second terminal together, shared content of either party can be directly placed in the information sharing window for real-time sharing, so that the terminals simultaneously display shared content of either party without changing display effects of the display windows corresponding to an application that has been started on the terminals, thereby effectively improving sharing experience.

In some embodiments, the second display region occupies a majority of the display and the information sharing window overlaps with the second display region and is rendered in a visually distinguishable manner. As shown in FIG. 2*b*, the information sharing window is at least partially transparent and divided into a matrix of grids of multiple sub-regions, each sub-region corresponding to a respective portion of the second display region. Note that, in this example, the objects in the information sharing window are from a game including one at least partially transparent background and one or more opaque objects at predefined locations as defined by the game in the information sharing window. If the object in the information sharing window is an image that is opaque, the first terminal first processes the image to be partially transparent and then renders the partially transparent image in the information sharing window. In some embodiments, the object is a message from the second terminal including a comment and a location of the comment in the information sharing window. In response, the first terminal renders the comment at the designated location the information sharing window.

In sum, the first terminal receives a user instruction for rendering one or more objects in the information sharing window. In response to the user instruction, the first terminal renders the one or more objects in the information sharing window in a manner such that the live video stream in the covered portion of the one of the first display region and the second display region is visible to the user of the first terminal through the information sharing window.

Further, the first terminal detects a user interaction with one of the one or more objects in the information sharing window at the first terminal and performs an operation on the user-interacted object in the information sharing window at the first terminal. In addition, the first terminal sends an instruction to the second terminal, wherein the second terminal is configured to perform the operation on a corresponding object in the information sharing window at the first terminal.

Embodiment 2

Figure 2A:
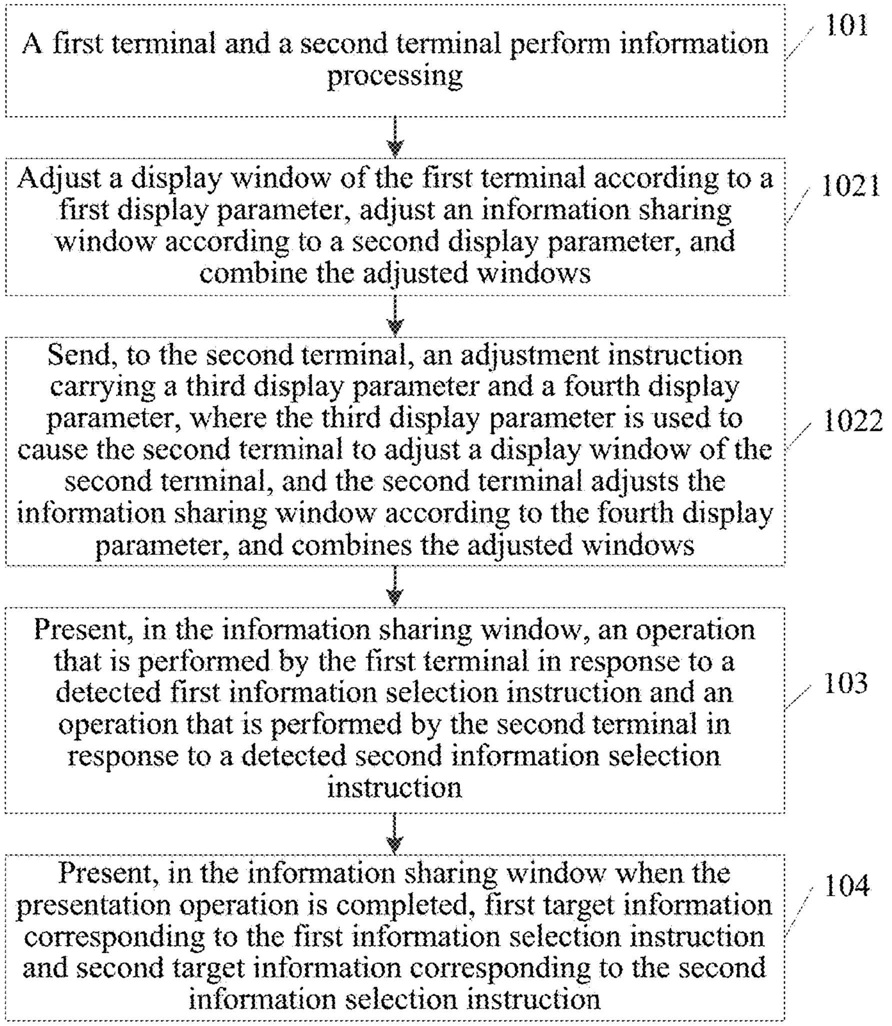
FIG. 2*a* is a schematic diagram of an implementation procedure of an information sharing method according to Embodiment 2 of this application.
Figure 2B:
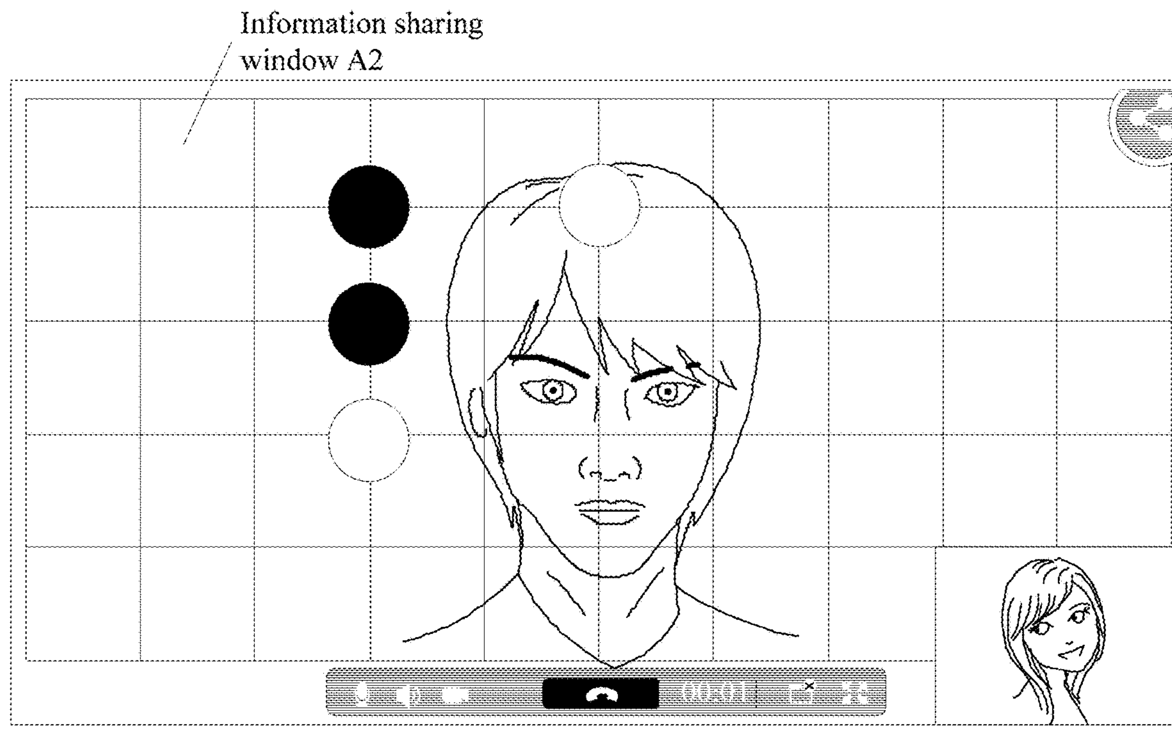
FIG. 2*b* is a first schematic display diagram of displaying two windows together by a terminal according to Embodiment 2 of this application.
Figure 2C:
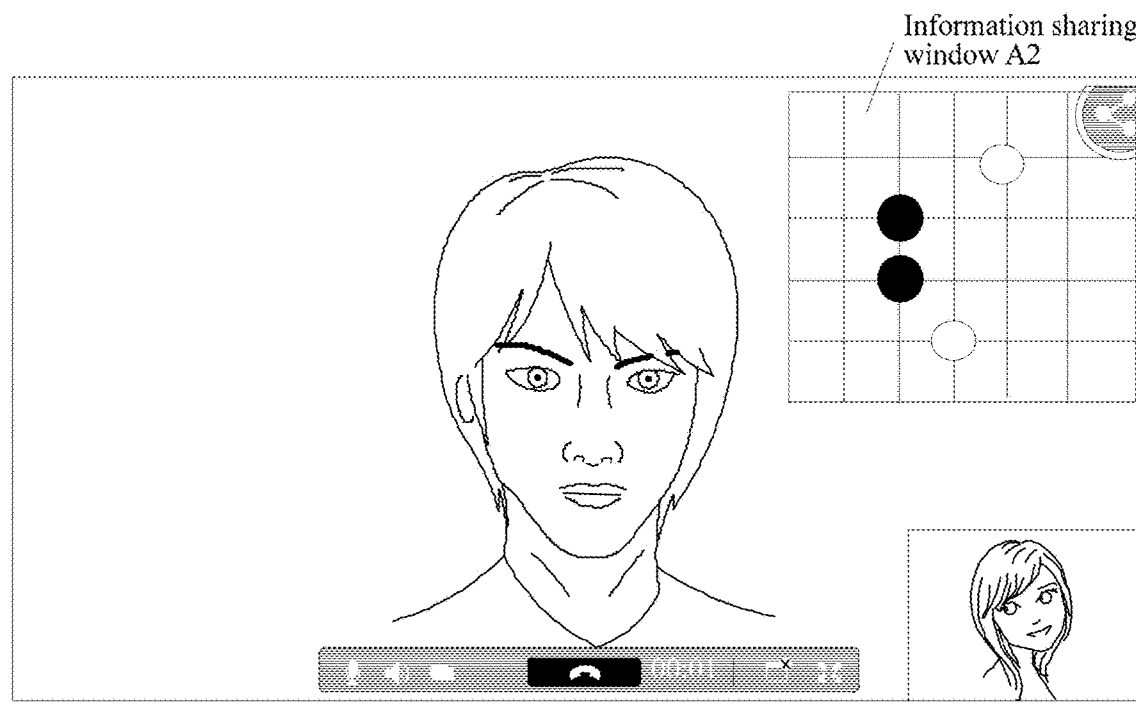
FIG. 2*c* is a second schematic display diagram of displaying two windows together by the terminal according to Embodiment 2 of this application.

FIG. 2_a_ is a schematic diagram of an implementation procedure of an information sharing method according to Embodiment 2 of this application. As shown in FIG. 2_a_, the method includes:

Step 101. A first terminal and a second terminal perform information processing.

Step 1021. Adjust a display window of the first terminal according to a first display parameter, adjust an information sharing window according to a second display parameter, and combine the adjusted windows.

The adjusted information sharing window and the adjusted display window of the first terminal are displayed through interposition in different transparencies.

Herein, the first display parameter and the second display parameter both include at least one of the following dimensions: a display transparency or a display area.

In an example, as shown in FIG. 2_b_, the adjusted information sharing window A2 entirely covers the adjusted display window of the first terminal. In this case, to ensure that display effects of both the two windows are not affected, display transparencies may be adjusted, so that a difference between the display transparencies of the two window is sufficiently great, which is equivalent to placing a virtual transparent information sharing window over the live chat window of the first terminal.

In another example, as shown in FIG. 2_c_, the adjusted information sharing window A2 and the adjusted display window of the first terminal respectively correspond to partial areas of a display interface of the first terminal, where the two windows may be partially overlapped or not overlapped at all.

Step 1022. Send, to the second terminal, an adjustment instruction carrying a third display parameter and a fourth display parameter, where the third display parameter is used to cause the second terminal to adjust a display window of the second terminal, and the second terminal adjusts the information sharing window according to the fourth display parameter, and combines the adjusted windows.

The adjusted information sharing window and the adjusted display window of the second terminal are displayed through interposition in different transparencies.

Herein, the adjusted information sharing window and the adjusted display window of the second terminal may be displayed through interposition in different transparencies in the following two manners: 1) The adjusted information sharing window partially covers or entirely covers the adjusted display window of the second terminal. In this case, to ensure that display effects of both the two windows are not affected, display transparencies may be adjusted, so that a difference between the display transparencies of the two window is sufficiently great, which is equivalent to placing a virtual transparent information sharing window over the display window of the second terminal; 2) The adjusted information sharing window and the adjusted display window of the second terminal respectively correspond to partial areas of a display interface of the second terminal. That is, the two windows are not overlapped.

It should be noted that, the first display parameter in step 1021 and the third display parameter in step 1022 in this embodiment of this application may be the same, and the second display parameter and the fourth display parameter may be the same. That is, display effects of the two terminals are the same.

Step 103. Present, in the information sharing window, an operation that is performed by the first terminal in response to a detected first information selection instruction and an operation that is performed by the second terminal in response to a detected second information selection instruction.

Step 104. Present, in the information sharing window when the presentation operation is completed, first target information corresponding to the first information selection instruction and second target information corresponding to the second information selection instruction.

In this embodiment of this application, in a process in which a first terminal and a second terminal perform information processing, a display window of the first terminal is adjusted according to a first display parameter, an information sharing window is adjusted according to a second display parameter, and the adjusted windows are combined; an adjustment instruction carrying a third display parameter and a fourth display parameter are sent to the second terminal, where the third display parameter is used to cause the second terminal to adjust a display window of the second terminal, and the second terminal adjusts the information sharing window according to the fourth display parameter, and combines the adjusted windows, so that the information sharing window and the live chat window of the first terminal are displayed together and the information sharing window and the display window of the second terminal are displayed together; an operation that is performed by the first terminal in response to a detected first information selection instruction and an operation that is performed by the second terminal in response to a detected second information selection instruction are further presented in the information sharing window; and first target information corresponding to the first information selection instruction and second target information corresponding to the second information selection instruction are presented in the information sharing window when the presentation operation is completed. In this way, based on displaying the information sharing window and the live chat window of the first terminal together and the information sharing window and the display window of the second terminal together, shared content of either party can be directly placed in the information sharing window for real-time sharing, so that the terminals simultaneously display shared content of either party without changing display effects of the display windows corresponding to an application that has been started on the terminals, thereby effectively improving sharing experience.

Embodiment 3

Figure 3A:
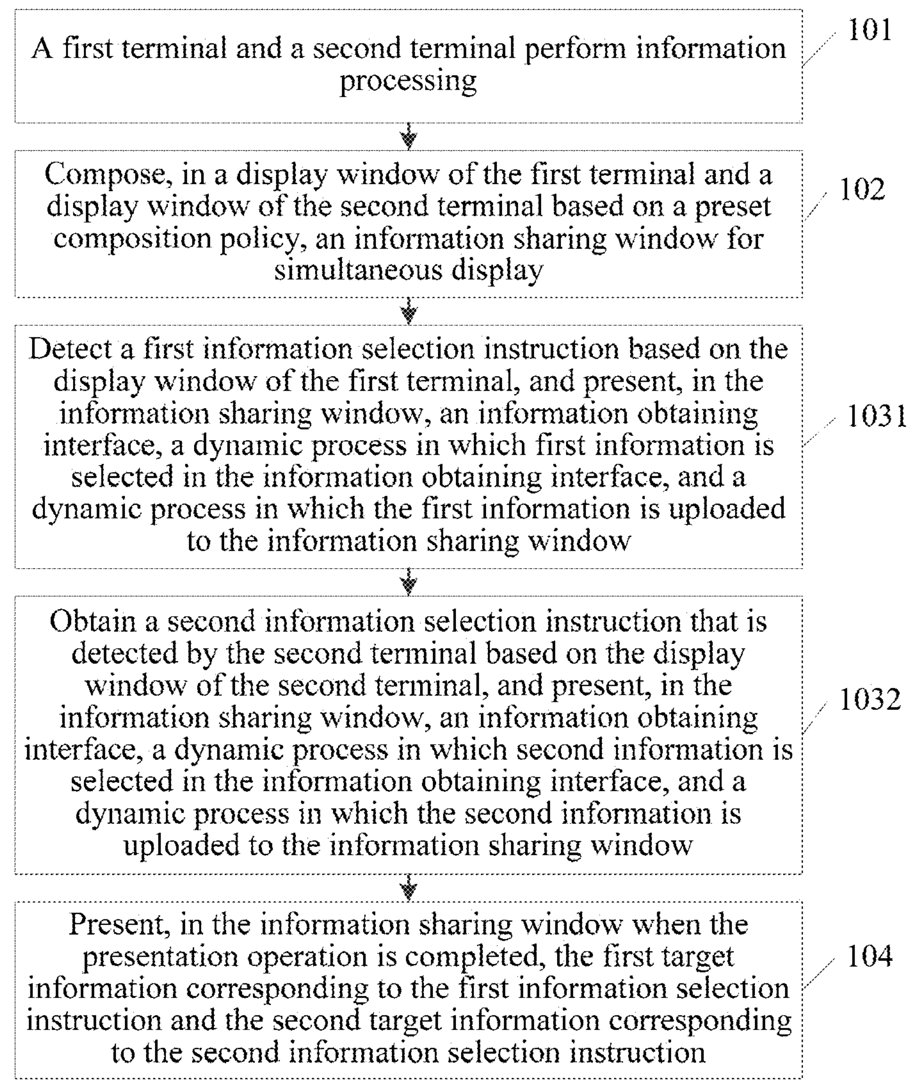
FIG. 3*a* is a schematic diagram of an implementation procedure of an information sharing method according to Embodiment 3 of this application.

FIG. 3*a* is a schematic diagram of an implementation procedure of an information sharing method according to Embodiment 3 of this application. As shown in FIG. 3*a*, the method includes:

Step 101. A first terminal and a second terminal perform information processing.

Step 102. Compose, in a display window of the first terminal and a display window of the second terminal based on a preset composition policy, an information sharing window for simultaneous display, so that the information sharing window and the live chat window of the first terminal are displayed together, and the information sharing window and the display window of the second terminal are displayed together.

Step 1031. Detect a first information selection instruction based on the live chat window of the first terminal, and present, in the information sharing window, an information obtaining interface, a dynamic process in which first information is selected in the information obtaining interface, and a dynamic process in which the first information is uploaded to the information sharing window.

The information obtaining interface may be an interface for optional information, or may be in any other form, for example, an interface for calling a browser to query information.

Figure 3B:
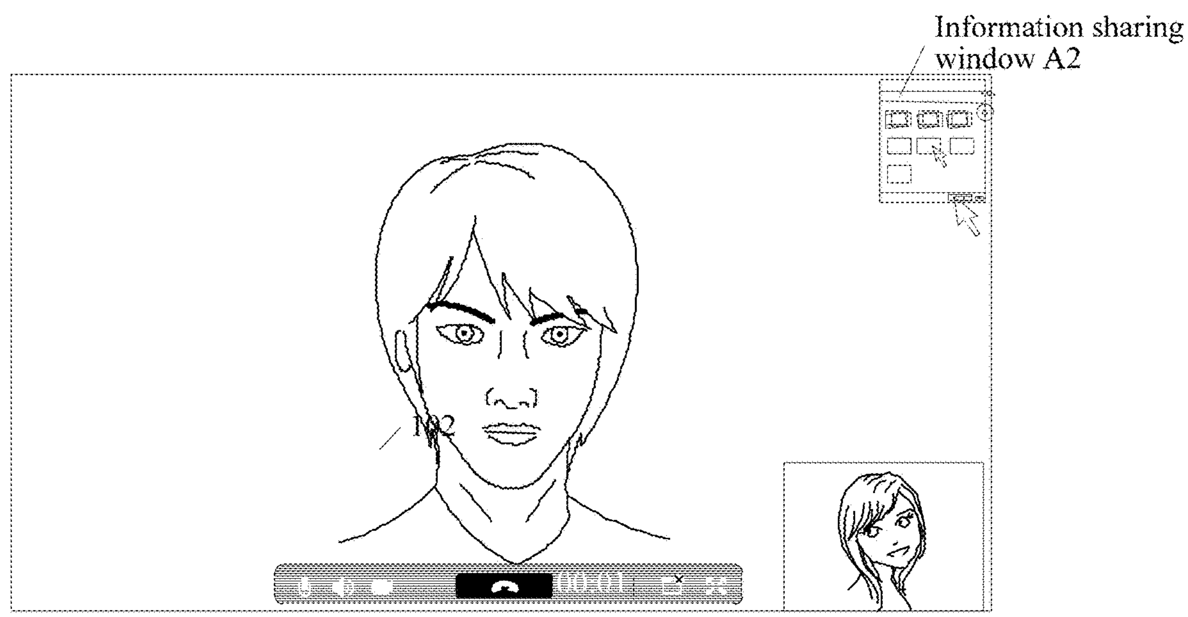
FIG. 3*b* is a schematic display diagram of displaying two windows together by a terminal according to Embodiment 3 of this application.

In an example, as shown in FIG. 3*b*, the first information is a related file stored in a local file folder. A first information selection instruction is detected based on the live chat window of the first terminal A, and an information obtaining interface, a dynamic process in which the first information is selected in the information obtaining interface, and a dynamic process in which the first information is uploaded to the information sharing window A2 are presented in the information sharing window A2.

Step 1032. Obtain a second information selection instruction that is detected by the second terminal based on the display window of the second terminal, and present, in the information sharing window, an information obtaining interface, a dynamic process in which second information is selected in the information obtaining interface, and a dynamic process in which the second information is uploaded to the information sharing window.

Step 104. Present, in the information sharing window when the presentation operation is completed, the first target information corresponding to the first information selection instruction and the second target information corresponding to the second information selection instruction.

In this embodiment of this application, in a process in which a first terminal and a second terminal perform information processing, an information sharing window for simultaneous display is composed in a display window of the first terminal and a display window of the second terminal based on a preset composition policy, so that the information sharing window and the live chat window of the first terminal are displayed together, and the information sharing window and the display window of the second terminal are displayed together; further, a first information selection instruction is detected based on the live chat window of the first terminal, and an information obtaining interface, a dynamic process in which first information is selected in the information obtaining interface, and a dynamic process in which the first information is uploaded to the information sharing window are presented in the information sharing window; a second information selection instruction that is detected by the second terminal based on the display window of the second terminal is obtained, and an information obtaining interface, a dynamic process in which second information is selected in the information obtaining interface, and a dynamic process in which the second information is uploaded to the information sharing window are presented in the information sharing window; and the first target information corresponding to the first information selection instruction and the second target information corresponding to the second information selection instruction are presented in the information sharing window when the presentation operation is completed. In this way, based on displaying the information sharing window and the live chat window of the first terminal together and the information sharing window and the display window of the second terminal together, shared content of either party can be directly placed in the information sharing window for real-time sharing, so that the terminals simultaneously display shared content of either party without changing display effects of the display windows corresponding to an application that has been started on the terminals, thereby effectively improving sharing experience.

Embodiment 4

Figure 4A:
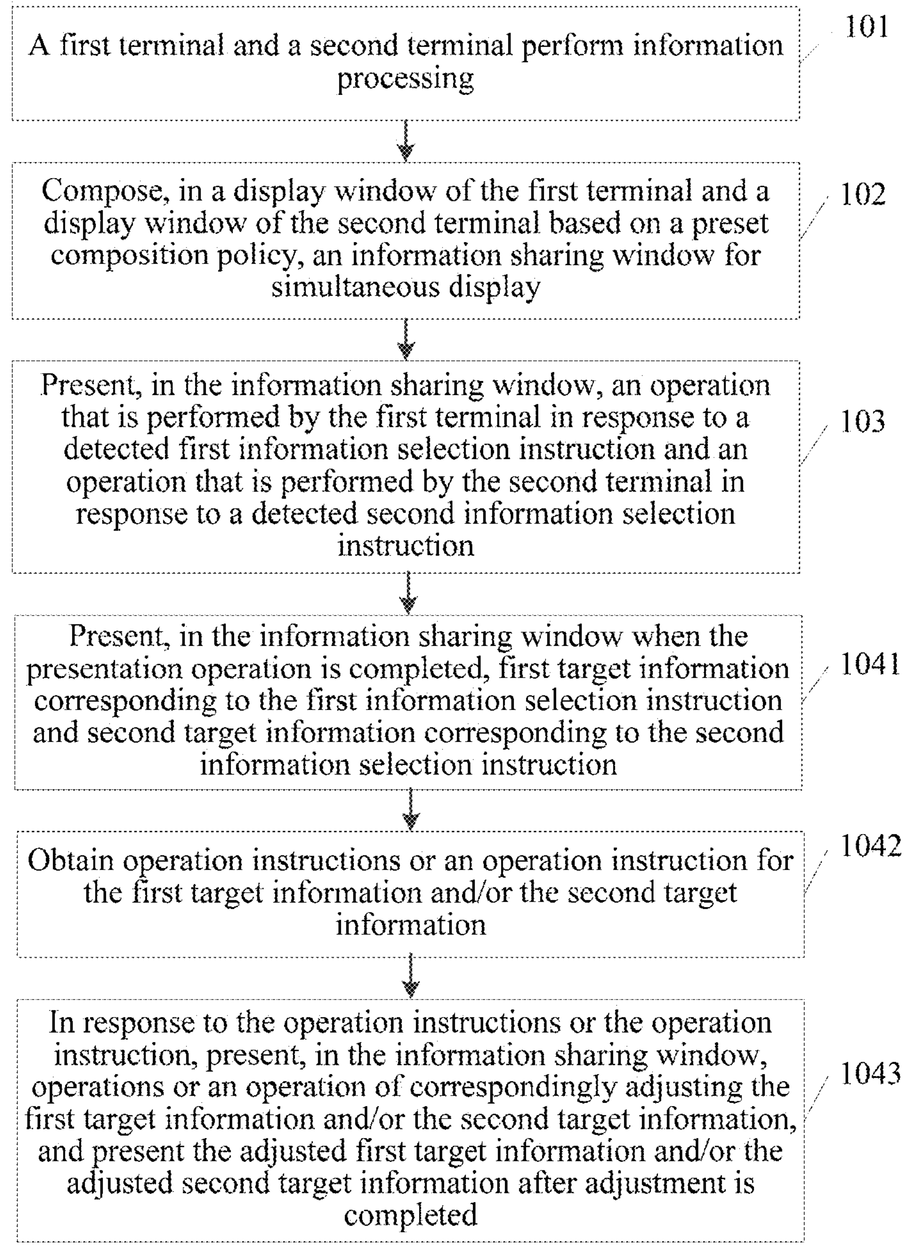
FIG. 4*a* is a schematic diagram of an implementation procedure of an information sharing method according to Embodiment 4 of this application.

FIG. 4*a* is a schematic diagram of an implementation procedure of an information sharing method according to Embodiment 4 of this application. As shown in FIG. 4*a*, the method includes:

Step 101. A first terminal and a second terminal perform information processing.

Herein, the first terminal performs information processing by running a first application and by using the second terminal running the first application. The first application may be any application scenario such as a video call, a text chat, or an interactive game. Certainly, in this embodiment of this application, in a process in which the first terminal performs information processing by running the first application and by using the second terminal running the first application, related information corresponding to the first application is presented in a display window of the first terminal, and related information corresponding to the first application is presented in a display window of the second terminal.

Step 102. Compose, in a display window of the first terminal and a display window of the second terminal based on a preset composition policy, an information sharing window for simultaneous display, so that the information sharing window and the live chat window of the first terminal are displayed together, and the information sharing window and the display window of the second terminal are displayed together.

Step 103. Present, in the information sharing window, an operation that is performed by the first terminal in response to a detected first information selection instruction and an operation that is performed by the second terminal in response to a detected second information selection instruction.

Step 1041. Present, in the information sharing window when the presentation operation is completed, first target information corresponding to the first information selection instruction and second target information corresponding to the second information selection instruction.

Step 1042. Obtain operation instructions or an operation instruction for the first target information and/or the second target information, where the operation instructions or the operation instruction are/is obtained based on detecting the information sharing window presented by the first terminal, or based on detecting the information sharing window presented by the second terminal.

Step 1043. In response to the operation instructions or the operation instruction, present, in the information sharing window, operations or an operation of correspondingly adjusting the first target information and/or the second target information, and present the adjusted first target information and/or the adjusted second target information after adjustment is completed.

Herein, the first target information and the second target information may include multiple types such as a picture, a game, news, a micro blog, a web page, a geographical position, or a POI that is to be shared. Certainly, types of the target information corresponding to the first information selection instruction and the target information corresponding to the second information selection instruction may be the same or may be different.

Figure 4B:
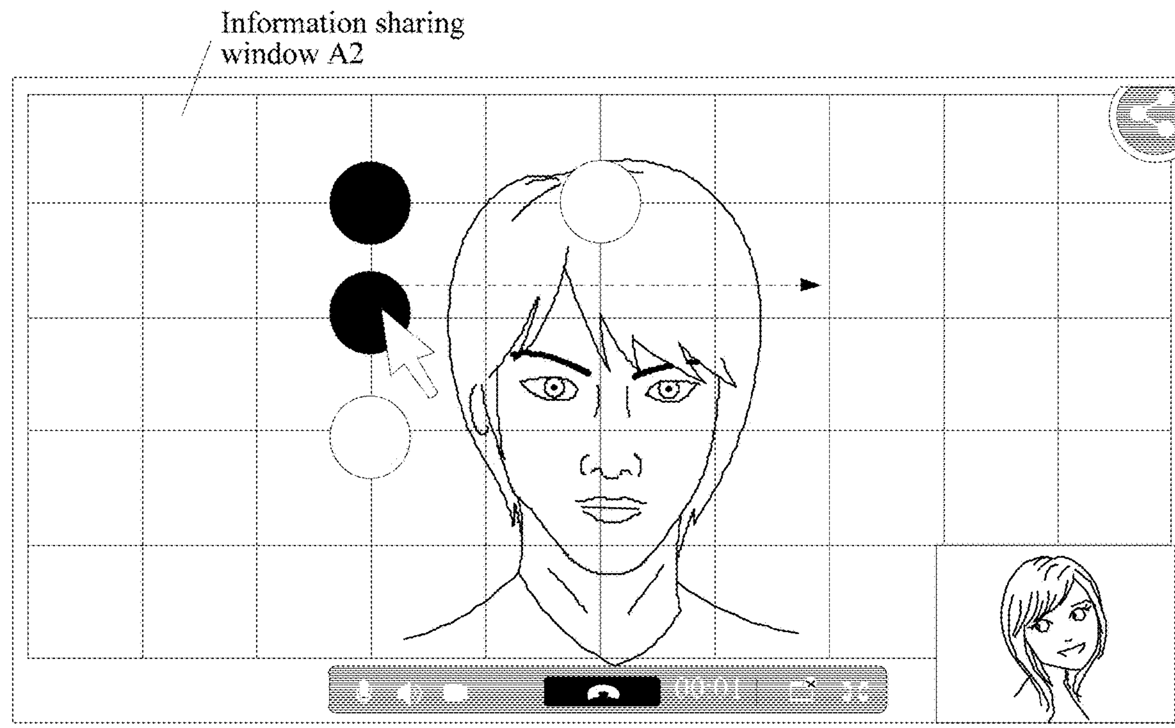
FIG. 4*b* is a first schematic display diagram of displaying two windows together by a terminal according to Embodiment 4 of this application.
Figure 4C:
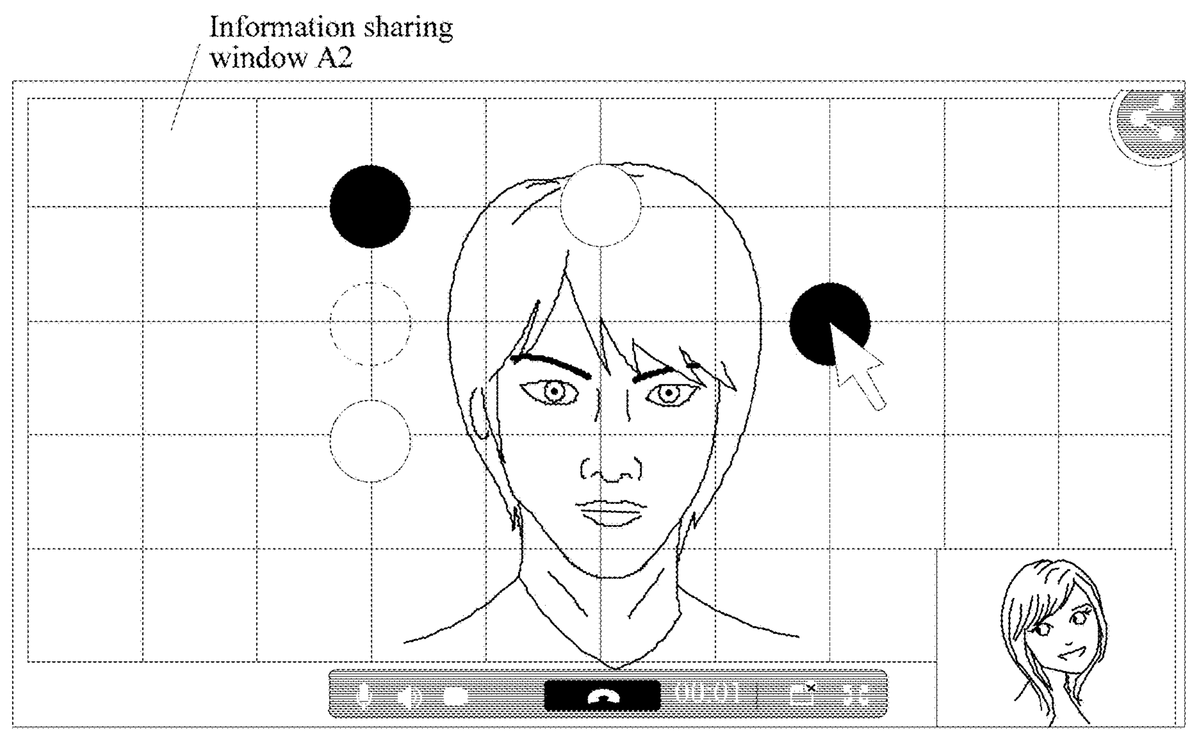
FIG. 4*c* is a second schematic display diagram of displaying two windows together by the terminal according to Embodiment 4 of this application.

In an example, as shown in FIG. 4*b*, based on presenting interactive interface information of a gobang game in the information sharing window A2 of the first terminal A by using step 1041, an operation instruction for the interactive interface information of the gobang game is obtained by using step 1042. Further, in step 1043, in response to the operation instruction, an operation of correspondingly adjusting the interactive interface information of the gobang game is presented in the information sharing window A2, and the adjusted interactive interface information of the gobang game is presented after adjustment is completed, as shown in FIG. 4*c*.

In this embodiment of this application, in a process in which a first terminal and a second terminal perform information processing, an information sharing window for simultaneous display is composed in a display window of the first terminal and a display window of the second terminal based on a preset composition policy, so that the information sharing window and the live chat window of the first terminal are displayed together, and the information sharing window and the display window of the second terminal are displayed together; further, an operation that is performed by the first terminal in response to a detected first information selection instruction and an operation that is performed by the second terminal in response to a detected second information selection instruction are presented in the information sharing window; first target information corresponding to the first information selection instruction and second target information corresponding to the second information selection instruction are presented in the information sharing window when the presentation operation is completed; operation instructions or an operation instruction for the first target information and/or the second target information are/is obtained, where the operation instructions or the operation instruction are/is obtained based on detecting the information sharing window presented by the first terminal, or based on detecting the information sharing window presented by the second terminal; and in response to the operation instructions or the operation instruction, operations or an operation of correspondingly adjusting the first target information and/or the second target information are/is presented in the information sharing window, and the adjusted first target information and/or the adjusted second target information are/is presented after adjustment is completed. In this way, based on displaying the information sharing window and the live chat window of the first terminal together and the information sharing window and the display window of the second terminal together, shared content of either party can be directly placed in the information sharing window for real-time sharing, so that the terminals simultaneously display shared content of either party without changing display effects of the display windows corresponding to an application that has been started on the terminals, and further synchronize an interactive operation of either party on the shared content, thereby effectively improving sharing experience.

Embodiment 5

Figure 5:
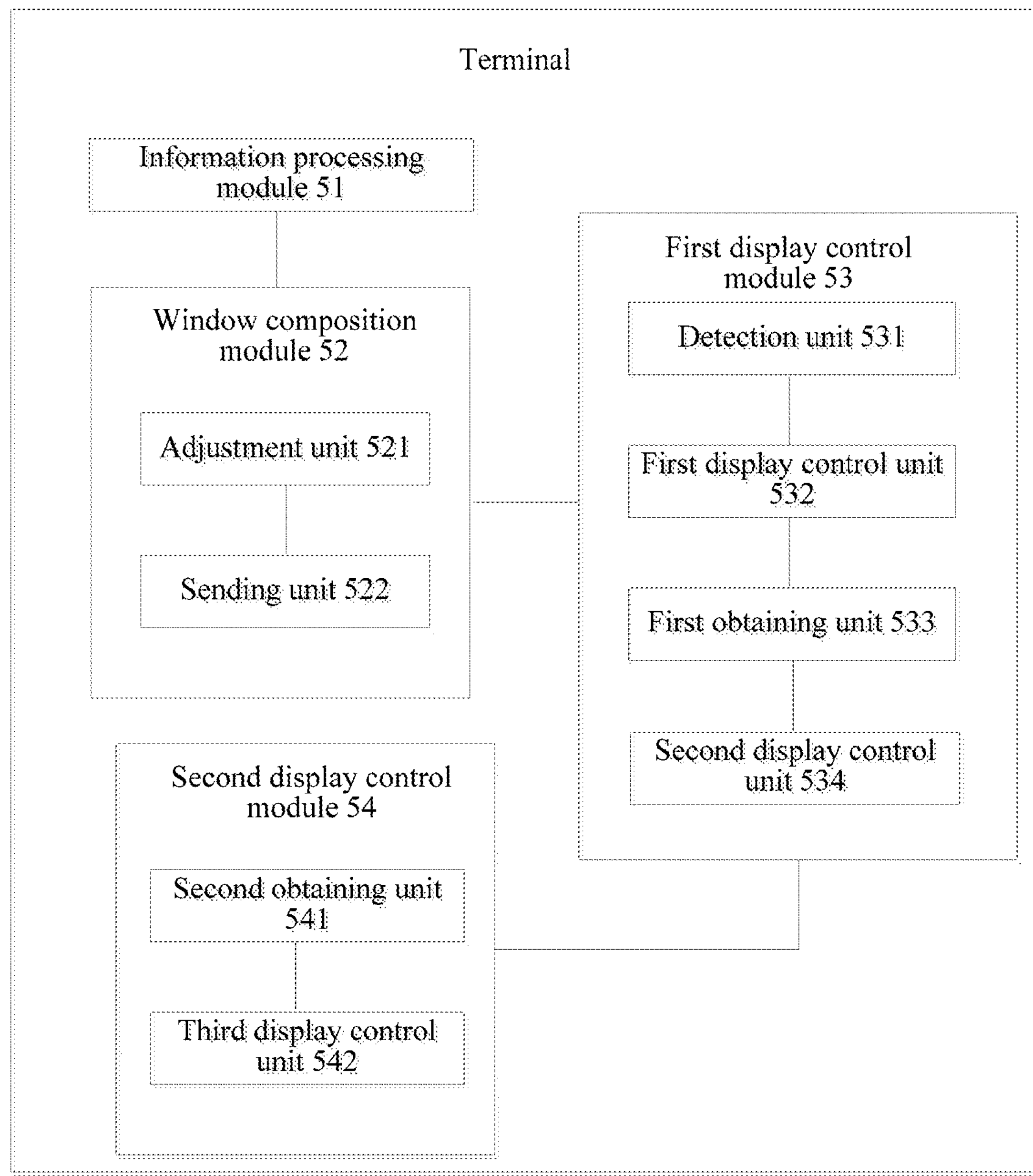
FIG. 5 is a schematic diagram of a compositional structure of a terminal according to Embodiment 5 of this application.

FIG. 5 is a schematic diagram of a compositional structure of a terminal according to Embodiment 5 of this application. As shown in FIG. 5, the terminal is a first terminal, and the first terminal includes an information processing module 51, a window composition module 52, a first display control module 53, and a second display control module 54.

The information processing module 51 is configured to implement an information processing process between the first terminal and a second terminal.

The window composition module 52 is configured to compose, in a display window of the first terminal and a display window of the second terminal based on a preset composition policy, an information sharing window for simultaneous display, so that the information sharing window and the live chat window of the first terminal are displayed together, and the information sharing window and the display window of the second terminal are displayed together.

The first display control module 53 is configured to present, in the information sharing window, an operation that is performed by the first terminal in response to a detected first information selection instruction and an operation that is performed by the second terminal in response to a detected second information selection instruction.

The second display control module 54 is configured to present, in the information sharing window when the presentation operation is completed, first target information corresponding to the first information selection instruction and second target information corresponding to the second information selection instruction.

In an embodiment, as shown in FIG. 5, the window composition module 52 includes an adjustment unit 521.

The adjustment unit 521 is configured to: adjust the live chat window of the first terminal according to a first display parameter, adjust the information sharing window according to a second display parameter, and combine the adjusted windows, where the adjusted information sharing window and the adjusted display window of the first terminal are displayed through interposition in different transparencies.

In an embodiment, as shown in FIG. 5, the window composition module 52 further includes a sending unit 522.

The sending unit 522 is configured to send, to the second terminal, an adjustment instruction carrying a third display parameter and a fourth display parameter, where the third display parameter is used to cause the second terminal to adjust the display window of the second terminal, and the second terminal adjusts the information sharing window according to the fourth display parameter, and combines the adjusted windows, where the adjusted information sharing window and the adjusted display window of the second terminal are displayed through interposition in different transparencies.

In an embodiment, as shown in FIG. 5, the first display control module 53 includes a detection unit 531, a first display control unit 532, a first obtaining unit 533, and a second display control unit 534.

The detection unit 531 is configured to detect the first information selection instruction based on the live chat window of the first terminal.

The first display control unit 532 is configured to control to present, in the information sharing window, the operation that is performed by the first terminal in response to the first information selection instruction.

Specifically, the first display control unit 532 is configured to: control to present an information obtaining interface in the information sharing window, and control to present a dynamic process in which the first information is selected in the information obtaining interface, and a dynamic process in which the first information is uploaded to the information sharing window.

The first obtaining unit 533 is configured to obtain the second information selection instruction that is detected by the second terminal based on the display window of the second terminal.

The second display control unit 534 is configured to control to present, in the information sharing window, the operation that is performed by the second terminal in response to the second information selection instruction.

In an embodiment, as shown in FIG. 5, the second display control module 54 includes a second obtaining unit 541 and a third display control unit 542.

The second obtaining unit 541 is configured to obtain operation instructions or an operation instruction for the first target information and/or the second target information, where the operation instructions or the operation instruction are/is obtained based on detecting the information sharing window presented by the first terminal, or based on detecting the information sharing window presented by the second terminal.

The third display control unit 542 is configured to: in response to the operation instructions or the operation instruction, control to present, in the information sharing window, operations or an operation of correspondingly adjusting the first target information and/or the second target information, and present the adjusted first target information and/or the adjusted second target information after adjustment is completed.

Certainly, the first terminal and the second terminal in this embodiment of this application are equivalent. That is, in actual application, a compositional structure of the second terminal may be entirely similar to the compositional structure of the first terminal.

It should be noted herein that the description in the foregoing terminal Embodiment 5 is similar to the description of the method above, and the terminal embodiment has same beneficial effects as those of method Embodiments 1 to 4, and details are therefore not described again. For technical details not disclosed in terminal Embodiment 5 of this application, a person skilled in the art can refer to the descriptions in method Embodiments 1 to 4 of this application for understanding. For brevity, the technical details are not described herein again.

Embodiment 6

Figure 6:
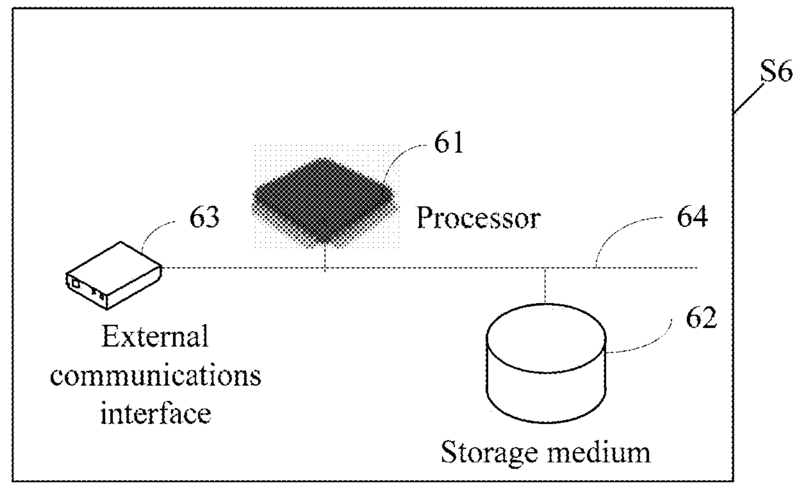
FIG. 6 is a schematic diagram of a hardware structure of a terminal according to an embodiment of this application.

This embodiment provides specific hardware based on any one of the foregoing embodiments. As shown in FIG. 6, the computing apparatus S6 includes a processor 61, a storage medium 62, at least one external communications interface 63. The processor 61, the storage medium 62, and the external communications interface 63 are all connected by using a bus 64. The processor 61 may be an electronic component having a processing function such as a microprocessor, a central processing unit, a digital signal processor, or a programmable logic array. The storage medium 62 is a non-transitory computer readable storage medium storing computer executable code.

The hardware may be the first terminal described in any one of the foregoing embodiments.

When the hardware is the first terminal, when the processor 61 executes the computer executable code, at least the following functions can be implemented:

performing, by a first terminal and a second terminal, information processing;

composing, in a display window of the first terminal and a display window of the second terminal, an information sharing window for simultaneous display, so that the information sharing window and the live chat window of the first terminal are displayed together, and the information sharing window and the display window of the second terminal are displayed together;

presenting, in the information sharing window, an operation that is performed by the first terminal in response to a detected first information selection instruction and an operation that is performed by the second terminal in response to a detected second information selection instruction; and presenting, in the information sharing window when the presentation operation is completed, first target information corresponding to the first information selection instruction and second target information corresponding to the second information selection instruction.

Figure 7:
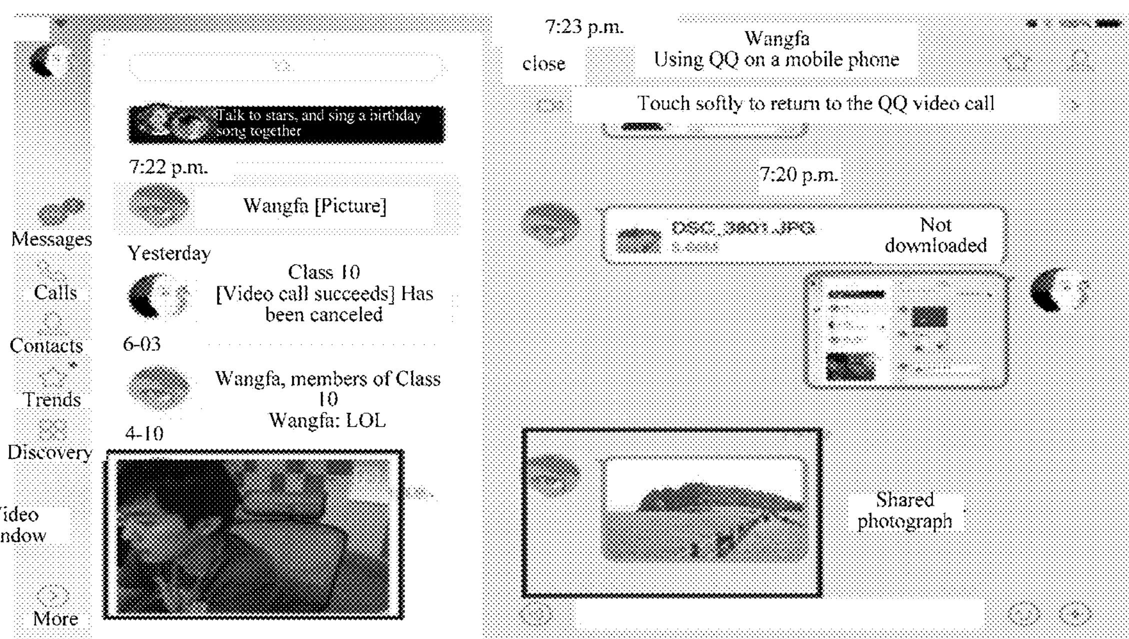
FIG. 7 is a schematic display diagram of displaying a window by a terminal in a conventional information sharing method.

A specific application scenario 1:

FIG. 7 is a schematic display diagram of displaying a window by a terminal in a conventional information sharing method. As shown in FIG. 7, in a process in which a first terminal A and a second terminal B enter a QQ video call mode, if the first terminal A intends to share a photograph with the second terminal B, the first terminal A first exits a full-screen mode of the video call, opens an AIO window for a QQ chat with the second terminal B, and further sends the to-be-shared photograph to the second terminal B by using the AIO window. Certainly, after the first terminal A and the second terminal B share the photograph in the foregoing manner, the two parties can only view the photograph, and cannot comment on the photograph at the same time or perform another interactive operation by using the photograph.

However, during a video call, a terminal user shares a photograph mainly to find more topics on the shared photograph, for example, comment on the photograph at the same time, that is, point out a particular detail of the photograph so that the other party can also see the detail, and have more interactions for the photograph. However, in the conventional information sharing method, to share multimedia information such as a photograph, a user has to exit an immersive full-screen video chat mode and enter an AIO window. Consequently, the user cannot continue experiencing an immersive full-screen chat, and emotional experience is absent. Moreover, after the multimedia information such as a photograph is shared, more interactions of users for the shared information cannot be satisfied by using the conventional sharing method, significantly affecting user experience.

Figure 8:
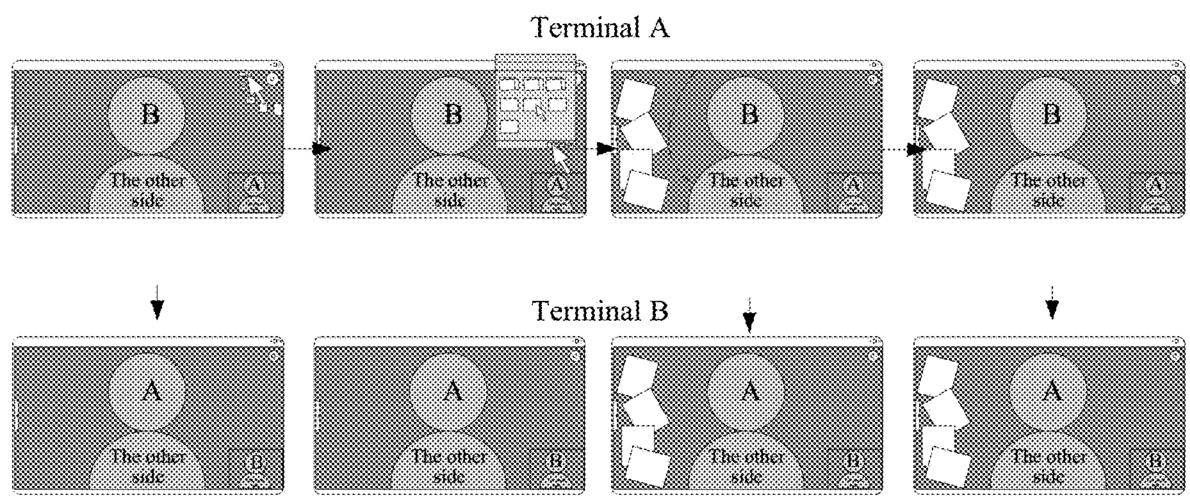
FIG. 8 is a schematic display diagram of displaying a window by a terminal in an information sharing method in an application example of this application.

A specific application scenario 2:

FIG. 8 is a schematic display diagram of displaying a window by a terminal in an information sharing method in an application example of this application. As shown in FIG. 8, first, in a process in which a first terminal A and a second terminal B carry out a full-screen video call, a video image of the second terminal B and a video image of the first terminal A are displayed in a display window of the first terminal A, and the video image of the first terminal A and the video image of the second terminal B are displayed in a display window of the second terminal B; then, an obtaining interface for a shared photograph is presented in an information sharing window for simultaneous display that is composed in the live chat window of the first terminal A and the display window of the second terminal B based on a preset composition policy, where a dynamic process in which the shared photograph is selected and a dynamic process in which the shared photograph is uploaded to the information sharing window are displayed in the obtaining interface; further, when the presentation operation is completed, that is, after the shared photograph is uploaded, the shared photograph is presented in the information sharing window; and finally, after an operation instruction of either party for the shared photograph, for example, an interactive operation instruction such as changing a position or a size of the shared photograph, or pointing out a particular detail of the photograph, is obtained, an operation of correspondingly adjusting the shared photograph is presented in the information sharing window, and the adjusted shared photograph is presented after adjustment is completed. Certainly, in actual application, in addition to sharing picture information such as a photograph by using the information sharing method described in the embodiments of this application, multimedia information such as a game, news, a micro blog, a web page, a geographical position, or a POI may further be shared.

In this way, based on displaying the information sharing window and the live chat window of the first terminal A together and the information sharing window and the display window of the second terminal B together, shared content of either party can be directly placed in the information sharing window for real-time sharing, so that the terminals simultaneously display shared content of either party without changing display effects of the display windows corresponding to an application that has been started on the terminals, and further synchronize an interactive operation of either party on the shared content, thereby effectively improving sharing experience.

Herein, it should further be noted that, the terminal involved in the foregoing embodiments may be an electronic device such as a PC, or may be a portable electronic device such as a PAD, a tablet computer, or a laptop computer, or may be an intelligent mobile terminal such as a mobile phone, and is not limited to the description herein. The terminal includes at least a database for storing data and a processor for information processing, or includes a storage medium that is disposed inside the terminal or independently disposed.

For the processor for information processing, a microprocessor, a central processing unit (CPU), a digital signal processor (DSP), or a field-programmable gate array (FPGA) may be used to perform processing. The storage medium includes operation instructions, where the operation instructions may be computer executable code, and the operation instructions are used to implement the steps in the processes of the information processing methods in the foregoing embodiments of this application.

In the several embodiments provided in this application, it should be understood that, the disclosed devices and methods may be implemented in other manners. The device embodiments described above are merely illustrative. For example, the division of the units is only a division of logical functions. In actual implementations, there may be another division manner. For example, multiple units or components may be combined, or may be integrated into another system, or some features may be omitted, or not implemented. In addition, the coupling or direct coupling or communication connection among the compositional parts displayed or discussed may be implemented by using some interfaces. The indirect coupling or communication connection among the devices or the units may be electrical, mechanical, or in another form.

The foregoing units described as separate parts may be or may not be physically separate, and the components displayed as units may be or may not be physical units. The units may be located at one place, or may be distributed in multiple network units. Some or all of the units may be selected according to an actual requirement to implement the purposes of the solutions of the embodiments.

In addition, the functional units in the embodiments of this application may all be integrated in one processing unit, or each unit may be separately used as one unit, or two or more units may be integrated in one unit. The integrated unit may be implemented in the form of hardware, or may be implemented in the form of hardware in combination with a software functional unit.

It may be understood by a person of ordinary skill in the art that, all or some of the steps of the foregoing method embodiments may be implemented by a program instructing relevant hardware. The program may be stored in a computer readable storage medium, and when the program is executed, the steps including the method embodiments are performed. The storage medium may include various types of media that can store program code such as a mobile storage device, a read-only memory (ROM), a random access memory (RAM), a magnetic disk, or an optical disc.

Alternatively, if implemented in the form of a software functional module and sold or used as an independent product, the integrated unit in this application may also be stored in a computer readable storage medium. Based on such an understanding, essentials or parts contributing to the existing technology of the technical solutions in the embodiments of this application may be embodied in the form of a software product. The computer software product is stored in a storage medium, and includes several instructions used to cause a computer device (which may be a personal computer, a server, or a network device) to execute all or a part of the method described in the embodiments of this application. The storage medium includes various types of media that can store program code such as a mobile storage device, a ROM, a RAM, a magnetic disk, or an optical disc.

What is described above is merely specific implementations of this application, but the protection scope of this application is not limited to this. Changes or replacements easily occurring to any person skilled in the art within the technical scope disclosed in this application shall be covered by the protection scope of this application. Therefore, the protection scope of this application shall subject to the protection scope of the claims.

What is claimed is:

1. An information sharing method performed at a first terminal having a display, one or more processors and memory storing one or more programs to be executed by the one or more processors, wherein the first terminal is communicatively coupled to a second terminal, the method comprising:

launching a live video chat window on the display, the live video chat window including a first display region displaying a first live video stream captured by a camera of the first terminal and a second display region displaying a second live video stream captured by a camera of the second terminal, wherein the second display region occupies the entire display;

receiving, from a user of the first terminal, a request for information sharing between the first terminal and the second terminal;

in response to the user request, launching an information sharing window within a predefined region of the live video chat window, wherein the information sharing window: (1) at least partially covers at least a portion of one of the first display region and the second display region and (2) includes a plurality of affordances, each of the plurality of affordances representing an information type;

receiving, from the user of the first terminal, a user selection of a first affordance of the plurality of affordances, the first affordance corresponding to a first information type of an interactive game;

in response to the user selection:

displaying the information sharing window on top of the second display region, wherein the information sharing window has the same dimension as the second display region;

rendering the interactive game in the information sharing window, the interactive game including a partially transparent background and a plurality of game pieces distributed at predefined locations on the partially transparent background such that the live video stream in the second display region is visible to the user of the first terminal through the information sharing window; and causing the second terminal to render the interactive game in a second information sharing window at the second terminal in the same manner as in the information sharing window at the first terminal, wherein the plurality of game pieces are displayed at the same locations on both the first and second information sharing windows;

receiving, from the user of the first terminal, a user instruction to move a first game piece in the information sharing window; and in response to the user instruction:

moving the first game piece from a first position on the partially transparent background to a second position on the partially transparent background; and causing the second terminal to move the first game piece from a corresponding first position to a corresponding second position in the second information sharing window in the same manner as in the information sharing window at the first terminal.

2. The method according to claim 1, further comprising: forwarding the user request to the second terminal, wherein the second terminal is configured to launch an information sharing window within a predefined region of a live video chat window on a display of the second terminal.

3. The method according to claim 2, further comprising:

detecting a user interaction with an object in the information sharing window at the first terminal;

performing an operation on the user-interacted object in the information sharing window at the first terminal; and sending an instruction to the second terminal, wherein the second terminal is configured to perform the operation on the object in the information sharing window at the first terminal.

4. The method according to claim 1, further comprising:

adjusting the live chat window of the first terminal according to a first display parameter;

adjusting the information sharing window according to a second display parameter that is different from the first display parameter; and combining the two adjusted windows through interposition in different transparencies.

5. The method according to claim 1, wherein the information sharing window is divided into a matrix of grids of multiple sub-regions, each sub-region corresponding to a respective portion of the second display region.

6. The method according to claim 1, wherein the operation of rendering the one or more objects in the information sharing window includes:

processing an image to be partially transparent; and rendering the partially transparent image in the information sharing window.

7. The method according to claim 1, wherein the operation of rendering the one or more objects in the information sharing window includes:

receiving, from the second terminal, a comment from the second terminal and a location of the comment in the information sharing window; and rendering the comment at the designated location the information sharing window.

8. A first terminal, comprising:

a display;

one or more processors;

memory; and one or more program instructions stored in the memory that, when executed by the one or more processors, cause the first terminal to perform a plurality of operations including:

launching a live video chat window on the display, the live video chat window including a first display region displaying a first live video stream captured by a camera of the first terminal and a second display region displaying a second live video stream captured by a camera of a second terminal that is communicatively coupled to the first terminal, wherein the second display region occupies the entire display;

receiving, from a user of the first terminal, a request for information sharing between the first terminal and the second terminal;

in response to the user request, launching an information sharing window within a predefined region of the live video chat window, wherein the information sharing window: (1) at least partially covers at least a portion of one of the first display region and the second display region and (2) includes a plurality of affordances, each of the plurality of affordances representing an information type;

receiving, from the user of the first terminal, a user selection of a first affordance of the plurality of affordances, the first affordance corresponding to a first information type of an interactive game;

in response to the user selection:

displaying the information sharing window on top of the second display region, wherein the information sharing window has the same dimension as the second display region;

rendering the interactive game in the information sharing window, the interactive game including a partially transparent background and a plurality of game pieces distributed at predefined locations on the partially transparent background such that the live video stream in the second display region is visible to the user of the first terminal through the information sharing window; and causing the second terminal to render the interactive game in a second information sharing window at the second terminal in the same manner as in the information sharing window at the first terminal, wherein the plurality of game pieces are displayed at the same locations on both the first and second information sharing windows;

receiving, from the user of the first terminal, a user instruction to move a first game piece in the information sharing window; and in response to the user instruction:

moving the first game piece from a first position on the partially transparent background to a second position on the partially transparent background; and causing the second terminal to move the first game piece from a corresponding first position to a corresponding second position in the second information sharing window in the same manner as in the information sharing window at the first terminal.

9. The first terminal according to claim 8, wherein the plurality of operations further comprise:

forwarding the user request to the second terminal, wherein the second terminal is configured to launch an information sharing window within a predefined region of a live video chat window on a display of the second terminal.

10. The first terminal according to claim 9, wherein the plurality of operations further comprise:

detecting a user interaction with an object in the information sharing window at the first terminal;

performing an operation on the user-interacted object in the information sharing window at the first terminal; and sending an instruction to the second terminal, wherein the second terminal is configured to perform the operation on the object in the information sharing window at the first terminal.

11. The first terminal according to claim 8, wherein the plurality of operations further comprise:

adjusting the live chat window of the first terminal according to a first display parameter;

adjusting the information sharing window according to a second display parameter that is different from the first display parameter; and combining the two adjusted windows through interposition in different transparencies.

12. The first terminal according to claim 8, wherein the operation of rendering the one or more objects in the information sharing window includes:

processing an image to be partially transparent; and rendering the partially transparent image in the information sharing window.

13. The first terminal according to claim 8, wherein the operation of rendering the one or more objects in the information sharing window includes:

receiving, from the second terminal, a comment from the second terminal and a location of the comment in the information sharing window; and rendering the comment at the designated location the information sharing window.

14. A non-transitory computer readable storage medium storing a plurality of computer executable instructions, and the executable instructions being executed by one or more processors of a first terminal and cause the first terminal to perform a plurality of operations including:

launching a live video chat window on a display of the first terminal, the live video chat window including a first display region displaying a first live video stream captured by a camera of the first terminal and a second display region displaying a second live video stream captured by a camera of a second terminal that is communicatively coupled to the first terminal, wherein the second display region occupies the entire display;

receiving, from a user of the first terminal, a request for information sharing between the first terminal and the second terminal;

in response to the user request, launching an information sharing window within a predefined region of the live video chat window, wherein the information sharing window: (1) at least partially covers at least a portion of one of the first display region and the second display region and (2) includes a plurality of affordances, each of the plurality of affordances representing an information type;

receiving, from the user of the first terminal, a user selection of a first affordance of the plurality of affordances, the first affordance corresponding to a first information type of an interactive game in response to the user selection:

displaying the information sharing window on top of the second display region, wherein the information sharing window has the same dimension as the second display region;

rendering the interactive game in the information sharing window, the interactive game including a partially transparent background and a plurality of game pieces distributed at predefined locations on the partially transparent background such that the live video stream in the second display region is visible to the user of the first terminal through the information sharing window; and causing the second terminal to render the interactive game in a second information sharing window at the second terminal in the same manner as in the information sharing window at the first terminal, wherein the plurality of game pieces are displayed at the same locations on both the first and second information sharing windows;

receiving, from the user of the first terminal, a user instruction to move a first game piece in the information sharing window; and in response to the user instruction:

moving the first game piece from a first position on the partially transparent background to a second position on the partially transparent background; and causing the second terminal to move the first game piece from a corresponding first position to a corresponding second position in the second information sharing window in the same manner as in the information sharing window at the first terminal.

15. The non-transitory computer readable storage medium according to claim 14, wherein the plurality of operations further comprise:

forwarding the user request to the second terminal, wherein the second terminal is configured to launch an information sharing window within a predefined region of a live video chat window on a display of the second terminal.

16. The non-transitory computer readable storage medium according to claim 15, wherein the plurality of operations further comprise:

detecting a user interaction with an object in the information sharing window at the first terminal;

performing an operation on the user-interacted object in the information sharing window at the first terminal; and sending an instruction to the second terminal, wherein the second terminal is configured to perform the operation on the object in the information sharing window at the first terminal.

* * * * *